(No Model.)

F. C. GINTHER.

REFRIGERATOR.

No. 275,639.

Patented Apr. 10, 1883.

2 Sheets—Sheet 1.

Attest:
J. W. Fowler
H. B. Applewhait

Inventor:
Frederick C. Ginther
per attys.
A. H. Evans & Co (No Model.) 2 Sheets—Sheet 2.

F. C. GINTHER.
REFRIGERATOR.

No. 275,639. Patented Apr. 10, 1883.

Attest:
J. W. Fowler
H. B. Applewhaite

Inventor:
Frederick C. Ginther
per atty. A. H. Evans & Co.

UNITED STATES PATENT OFFICE.

FREDERICK C. GINTHER, OF BEDFORD, IOWA.

REFRIGERATOR.

SPECIFICATION forming part of Letters Patent No. 275,639, dated April 10, 1883.

Application filed September 16, 1882. (No model.)

*To all whom it may concern:*

Be it known that I, F. C. GINTHER, of Bedford, in the county of Taylor and State of Iowa, have invented certain Improvements in Refrigerators; and I hereby declare the following to be a full, clear, and exact description thereof, reference being had to the accompanying drawings, making part of this specification, in which—

Figure 1:
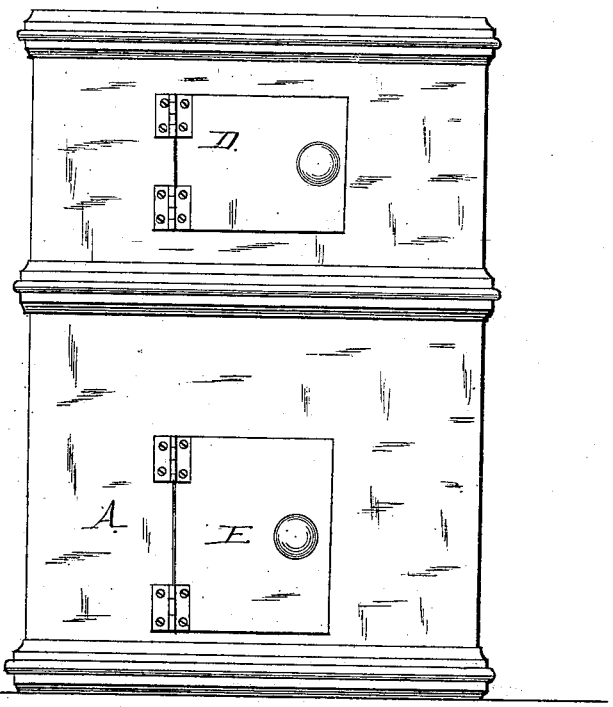
Figure 2:
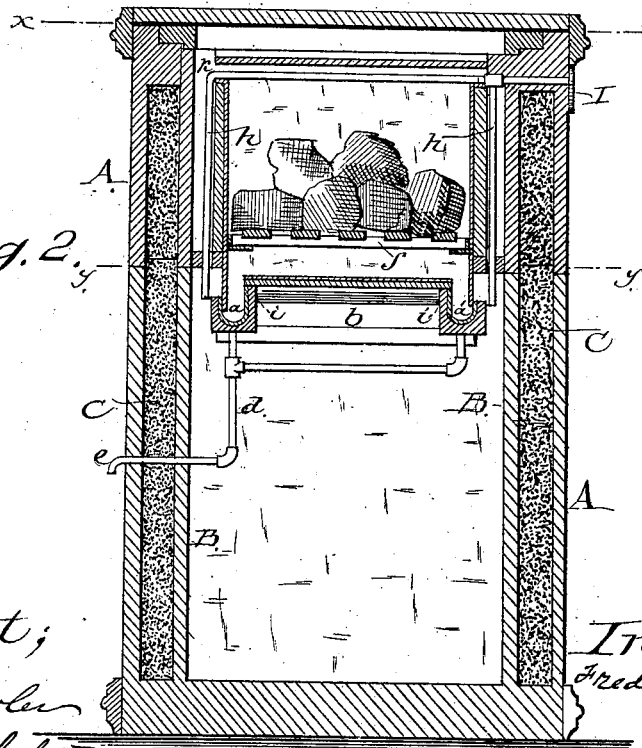
Figure 3:
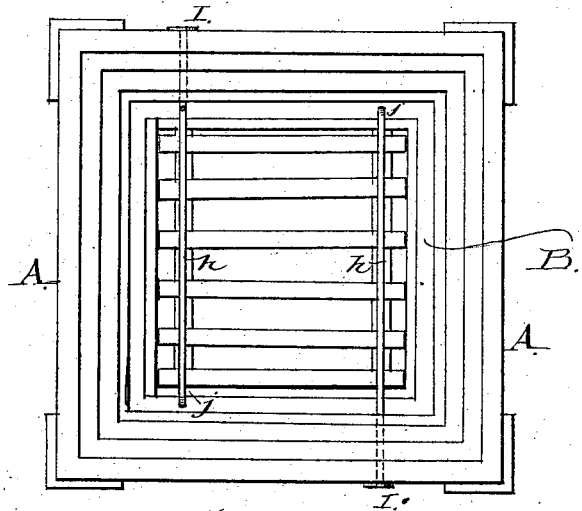
Figure 4:
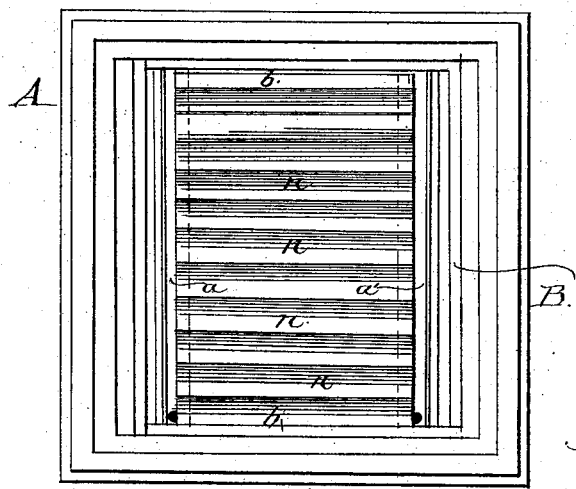
Figure 7:
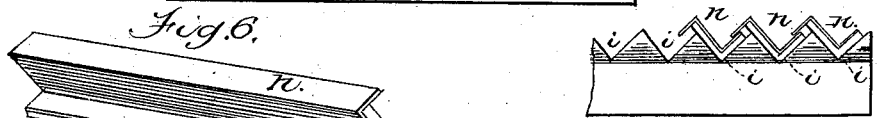
Figures 5, 6:
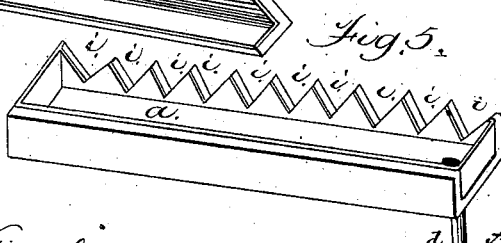

Figure 1 is a front elevation. Fig. 2 is a vertical sectional view. Fig. 3 is a cross-sectional view on line $xx$ of Fig. 2. Fig. 4 is a cross-sectional view on the line $yy$ of Fig. 2. Figs. 5, 6, and 7 are details to be referred to.

My invention relates to that class of refrigerators having doubled walls and an ice-chamber in its upper portion and a refrigerating-chamber in its lower portion; and my invention consists in certain details of construction, as hereinafter fully described, and specifically pointed out in the claim.

In order that those skilled in the art may make and use my invention, I will proceed to describe the manner in which I have carried it out.

In the said drawings, A A is the outer wall of the structure, and B B the inner walls. These are separated transversely, so that the structure is separable at this point as a matter of convenience, the joint being fitted so as to be air-tight. Between the outer and inner walls is a space, C, which is packed tightly with charcoal or any other desirable non-conductor of heat. Doors D E are provided in the air-cooling or refrigerating chamber and the ice-chamber, for the purpose of reaching the interior. In the lower portion of the structure, near its top, and immediately below the line of division between the sections, are two gutters, $a\,a'$, supported at their ends by cleats $b\,b'$ and drained by a pipe, $d$, having a branch to each gutter and an exit at $e$. The inner sides of the gutters $a\,a'$ are serrated at $ii$, to form bearings for the ends of a series of angular gutters, $n$, formed as seen in Fig. 6. The gutters, arranged as shown in the drawings, have their edges lap each other in such a manner that the drip from the ice, which rests on bars $f\,f$ immediately above them, cannot pass through to the chamber below, but is caught by the angular gutters, and from them passes into the gutters $a\,a'$, to be led off. The intervening space between the short lip and long lip of each alternate gutter provides a free passage of the air when it is sufficiently cold and condensed to descend into the refrigerating-chamber to preserve the provisions.

To keep up a proper circulation of air the heated air is allowed to flow from the provision-chamber through pipes $h\,h'$, arranged in the walls of the refrigerator at diagonal corners $j\,j$, and passing upward alongside the ice-chamber to the points $k$, where each pipe passes across the top of the refrigerator within the walls, and then through the top, across the ice-chamber, to and through the outer walls, where the open ends are controlled by means of valves I I. By this simple arrangement an effectual circulation is maintained.

Having thus described my invention, what I claim as new, and desire to secure by Letters Patent, is—

The combination and arrangement, in a refrigerator, of pipes $h\,h'$, arranged in the walls of the structure, passing across the top of the ice-chamber and controlled by exterior valves, I I, as specified.

FREDERICK C. GINTHER.

Witnesses:
JOHN V. WEBB,
THEODORE ENGLAND,
I. D. PECK.